(12) United States Patent
Michelsen

(10) Patent No.: US 9,552,283 B2
(45) Date of Patent: Jan. 24, 2017

(54) SPREADSHEET DATA TRANSFER OBJECTS

(75) Inventor: John J. Michelsen, Irving, TX (US)

(73) Assignee: CA, Inc., Islandia, NY (US)

( * ) Notice: Subject to any disclaimer, the term of this patent is extended or adjusted under 35 U.S.C. 154(b) by 1831 days.

(21) Appl. No.: 12/269,859

(22) Filed: Nov. 12, 2008

(65) Prior Publication Data

US 2015/0286552 A1    Oct. 8, 2015

Related U.S. Application Data

(60) Provisional application No. 60/987,107, filed on Nov. 12, 2007.

(51) Int. Cl.
*G06F 17/30* (2006.01)
*G06F 7/00* (2006.01)
*G06F 11/36* (2006.01)
*G06F 17/24* (2006.01)

(52) U.S. Cl.
CPC ....... *G06F 11/3684* (2013.01); *G06F 11/3688* (2013.01); *G06F 17/246* (2013.01)

(58) Field of Classification Search
CPC ............ G06F 17/246; G06F 8/20; G06F 8/34; G06F 8/71
See application file for complete search history.

(56) References Cited

U.S. PATENT DOCUMENTS

| | | | |
|---|---|---|---|
| 6,418,389 B2 * | 7/2002 | Peter et al. | 702/108 |
| 6,620,204 B1 * | 9/2003 | Malcolm | 715/209 |
| 6,775,824 B1 * | 8/2004 | Osborne et al. | 717/125 |
| 7,363,306 B1 * | 4/2008 | Hao et al. | 715/215 |
| 7,533,294 B2 * | 5/2009 | Mishra et al. | 714/10 |
| 7,561,997 B1 * | 7/2009 | Miller | 703/10 |
| 7,950,004 B2 * | 5/2011 | Vieira et al. | 717/125 |
| 8,001,530 B2 * | 8/2011 | Shitrit | 717/124 |
| 2003/0055836 A1 * | 3/2003 | Dubovsky | 707/102 |
| 2003/0131290 A1 * | 7/2003 | Weinberg et al. | 714/46 |
| 2004/0128400 A1 * | 7/2004 | Srinivasan et al. | 709/250 |
| 2004/0199818 A1 * | 10/2004 | Boilen et al. | 714/25 |
| 2006/0235732 A1 * | 10/2006 | Miller et al. | 705/7 |
| 2007/0150496 A1 * | 6/2007 | Feinsmith | 707/100 |

(Continued)

OTHER PUBLICATIONS

Lisa, 2.0 User's Guide, Interactive TKO, Feb. 27, 2003, pp. 1-130.

(Continued)

*Primary Examiner* — Dung K Chau
(74) *Attorney, Agent, or Firm* — Patent Capital Group

(57) ABSTRACT

Various systems and methods are disclosed for automatically generating a spreadsheet template to store information usable to generate one or more data transfer objects for input to a system under test. One such method involves identifying one or more properties of a data transfer object to be input to a software system under test. Identifying the properties of the data transfer object involves inspecting one or more structural requirements of a module within the software system under test that consumes that data transfer object. The method then automatically generates a spreadsheet template corresponding to the data transfer object, such that the spreadsheet template includes a respective column for each of the properties of the data transfer object. The spreadsheet template is configured to store information representing one or more versions of the data transfer object.

20 Claims, 5 Drawing Sheets

(56) References Cited

U.S. PATENT DOCUMENTS

2007/0178501 A1* 8/2007 Rabinowitz et al. ............. 435/6
2007/0180096 A1* 8/2007 Roth et al. .................... 709/223
2007/0180097 A1* 8/2007 Roth ............................ 709/223
2008/0059625 A1* 3/2008 Barnett et al. ................ 709/223
2008/0065941 A1* 3/2008 Lammel et al. .............. 714/746
2008/0162536 A1* 7/2008 Becker et al. ................ 707/102
2008/0282139 A1* 11/2008 Davis ........................... 715/205
2008/0313595 A1* 12/2008 Boulineau et al. ........... 717/101
2009/0024647 A1 1/2009 Hein

OTHER PUBLICATIONS

Lisa, 2.0 Developer's Guide, Interactive TKO, Mar. 13, 2003, pp. 1-23.

* cited by examiner

| | A | B | C | D | E | F | G | H | I | J | K | L |
|---|---|---|---|---|---|---|---|---|---|---|---|---|
| 1 | | | | | | | | | | | | |
| 2 | | Spec: | com.itko.examples.dto.Customer | | | | | | | | | |
| 3 | | DTO: | com.itko.examples.dto.Customer | | | | | | | | | |
| 4 | | Docs: | No docs available | | | | | | | | | |
| 5 | | Static Constructor Meth | No methods available | | | | | | | | | |
| 6 | | Static Constructor Field | No fields available | | | | | | | | | |
| 7 | | | | | | | | | | | | |
| 8 | | Primary Key | balance | id | name | poAddr.cit | poAddr.lin | poAddr.lin | poAddr.sta | poAddr.zip | since | types |
| 9 | | (unique per row) | double | int | String | String | String | String | String | String | Date | int[] |
| 10 | | | | | | | | | | | | |
| 11 | | | | | | | | | | | | | com.itko.examples.dto.Customer / xamples.dto.Customer.locations /

FIG. 2A

| | A | B | C | D | E | F | G | H | I | J | K | L |
|---|---|---|---|---|---|---|---|---|---|---|---|---|
| 1 | | | | | | | | | | | | |
| 2 | | Spec: | com.itko.examples.dto.Customer | | | | | | | | | |
| 3 | | DTO: | com.itko.examples.dto.Customer | | | | | | | | | |
| 4 | | Docs: | No docs available | | | | | | | | | |
| 5 | | Static Constructor Meth | No methods available | | | | | | | | | |
| 6 | | Static Constructor Field | No fields available | | | | | | | | | |
| 7 | | | | | | | | | | | | |
| 8 | | Primary Key | balance | id | name | poAddr.cit | poAddr.lin | poAddr.lin | poAddr.sta | poAddr.zip | since | types |
| 9 | | (unique per row) | double | int | String | String | String | String | String | String | Date | int[] |
| 10 | | 1 | 50 | 101 | iTKO | Dallas | 1505 LBJ F | Suite 250 | Tx | 75234 | 8/11/2007 | 1,5,10 |
| 11 | | 2 | 275 | 102 | Ron | Plano | 4509 Postbridge | | Tx | 75024 | 8/9/2007 | 2,4,9 |
| 12 | | 3 | 1000 | 103 | John | Dallas | 1505 LBJ F | Suite 250 | Tx | 75234 | 8/7/2007 | 3,7,9 |
| 13 | | | | | | | | | | | | |
| 14 | | | | | | | | | | | | |
| 15 | | | | | | | | | | | | | com.itko.examples.dto.Customer / xamples.dto.Customer.locations /

FIG. 2B

|   | A | B | C | D | E | F | G | H | I | J |
|---|---|---|---|---|---|---|---|---|---|---|
| 1 | | | | | | | | | | |
| 2 | | Spec: | com.itko.examples.dto.Customer.locations | | | | | | | |
| 3 | | DTO: | com.itko.examples.dto.Address | | | | | | | |
| 4 | | Docs: | No docs available | | | | | | | |
| 5 | | Static Con | No methods available | | | | | | | |
| 6 | | Static Con | No fields available | | | | | | | |
| 7 | | | | | | | | | | |
| 8 | | Primary K | com.itko.e | city | line1 | line2 | state | zip | | |
| 9 | | (unique per row) | (reference the containing DTO) | String | String | String | String | String | | |
| 10 | | | | | | | | | | |
| 11 | | | | | | | | | | |
| 12 | | | | | | | | | | |

*FIG. 2C*

|   | A | B | C | D | E | F | G | H | I | J |
|---|---|---|---|---|---|---|---|---|---|---|
| 1 | | | | | | | | | | |
| 2 | | Spec: | com.itko.examples.dto.Customer.locations | | | | | | | |
| 3 | | DTO: | com.itko.examples.dto.Address | | | | | | | |
| 4 | | Docs: | No docs available | | | | | | | |
| 5 | | Static Con | No methods available | | | | | | | |
| 6 | | Static Con | No fields available | | | | | | | |
| 7 | | | | | | | | | | |
| 8 | | Primary K | com.itko.e | city | line1 | line2 | state | zip | | |
| 9 | | (unique per row) | (reference the containing DTO) | String | String | String | String | String | | |
| 10 | | 1 | 1 | Dallas | 1 Main | | Tx | 75201 | | |
| 11 | | 2 | 1 | Plano | 67 Main | | Tx | 75075 | | |
| 12 | | 3 | 1 | Ft Worth | 19 Elm | #45 | Tx | 75566 | | |
| 13 | | 4 | 2 | Dallas | 10 Main | Suite 101 | Tx | 75201 | | |
| 14 | | 5 | 2 | Ft Worth | 147 Elm | | Tx | 75567 | | |
| 15 | | 6 | 3 | Dallas | 10 Main | Suite 101 | Tx | 75201 | | |
| 16 | | 7 | 3 | Houston | 12 Ave K | | Tx | 71010 | | |
| 17 | | | | | | | | | | |

*FIG. 2D*

SPREADSHEET DATA TRANSFER OBJECTS

RELATED APPLICATIONS

This invention claims priority, under 35 U.S.C. §119 (e), to U.S. Provisional Application 60/987,107, entitled "Spreadsheet Data Transport Objects," which was filed on Nov. 12, 2007 and names John Joseph Michelsen as inventor. The above-referenced application is hereby incorporated by reference in its entirety as if completely and fully set forth herein.

A portion of the disclosure of this patent document contains material which is subject to copyright protection. The copyright owner has no objection to the facsimile reproduction by anyone of the patent document or the patent disclosure, as it appears in the patent and trademark office patent file or records, but otherwise reserves all copyright rights whatsoever.

FIELD OF THE INVENTION

This invention relates to testing and, more particularly, to systems for automatically generating test cases.

DESCRIPTION OF THE RELATED ART

As software becomes more sophisticated, it becomes more difficult to quickly and easily perform thorough software testing. For example, a software system under test may interact with a relational database. The database can be populated via one or more services provided by the system under test. To validate these services during a test, it may be necessary to input multiple data objects to the system under test in order to cause the services to populate the database. Then a tester can interact with the system under test in order to validate the database, which in turn reveals whether the services used to populate that database operated properly.

Often, the data objects that are input to the system under test are very complex. For example, software systems used to provide online financial services may operate on data objects that include many different sets of properties, at least some of which may be nested. Generating the input data to create these data objects can be extraordinarily time consuming and/or error prone (e.g., it may require a user to input 60 pages of printed information to create a single test case). Furthermore, it is often difficult for a user, especially a user who is not adept at programming, to determine how to create the appropriate test fields required by the system under test. Accordingly, new techniques for generating test case data objects are desired.

BRIEF DESCRIPTION OF THE DRAWINGS

A more complete understanding of the present invention may be acquired by referring to the following description and the accompanying drawings, in which like reference numbers indicate like features.

FIGS. 2A, 2B, 2C, and 2D illustrate an example of a spreadsheet template generated by a spreadsheet data transfer object module, according to one embodiment of the present invention.

Figure 1:
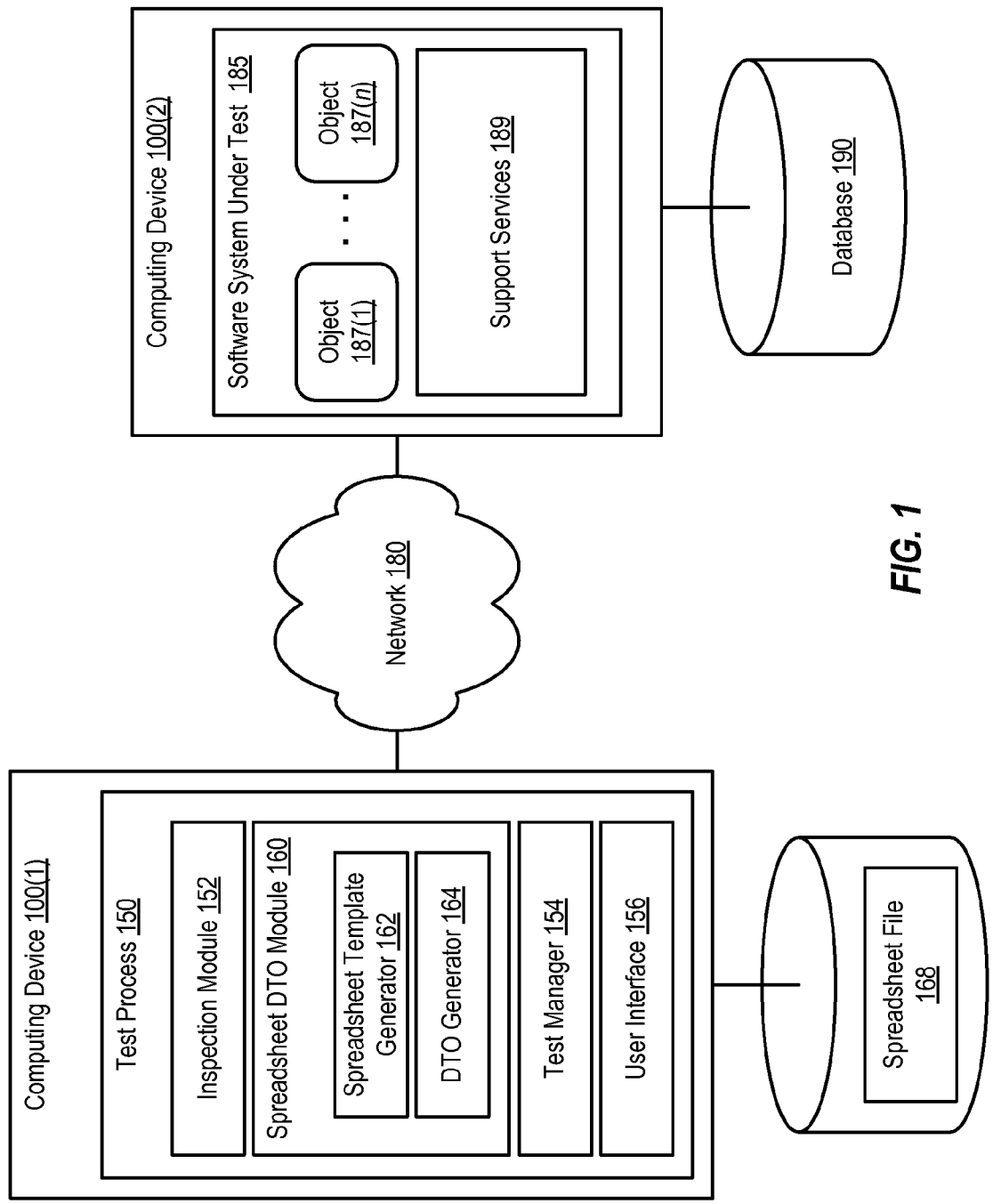
FIG. 1 is a block diagram of a client/server computing environment utilizing a spreadsheet data transfer object module in accordance with the present invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

FIG. 1 illustrates a client/server computing environment utilizing the spreadsheet data transfer object (DTO) tools of the present invention. FIG. 1 illustrates a system that includes two computing devices 100(1) and 100(2) that are coupled by a network 180. Network 180 can include a local area network (LAN) and/or wide area network (WAN) such as the Internet. Network 180 can be implemented using a variety of different protocols and/or communication media.

Computing device 100(1) implements a test process 150, which includes an inspection module 152, a spreadsheet DTO module 160, a test manager 154, and a user interface 156. Spreadsheet DTO module 160 includes a spreadsheet template generator 162 and a DTO generator 164. Computing device 100(1) is coupled to a storage device that stores one or more spreadsheet files 168. These spreadsheet files can be formatted for use with a spreadsheet program such as Microsoft Office Excel™, available from Microsoft Corporation of Redmond, Wash.

Test process 150 can be a functional test tool (e.g., a test tool that is designed to verify whether the system under test is functioning as intended), a performance test tool (e.g., a test tool that is designed to measure how the system under test performs under certain conditions), or a test tool that gathers significant metrics describing the operation of the system under test. In one embodiment, test process 150 is implemented using LISA™, available from iTKO, Inc. of Dallas, Tex.

Computing device 100(2) implements a software system under test 185, which includes a variety of software modules, including objects 187(1)-187(n) (collectively referred to as objects 187) and support services 189. Computing device 100(2) is coupled to a storage device (e.g., a storage array) that implements a database 190.

Software system under test 185 can include an application server, web server, and/or or other functionality. Objects 187 can include Enterprise JavaBeans (EJBs) and other objects, such as programs in Java wrappers. Support services 165 can be used to serve and maintain objects 187, as well as to support other aspects of distributed applications. Such support services can include management of distributed transactions, management of distributed objects, distributed invocations on distributed objects, and low-level system services. Examples of support services 165 include: database connectivity support, access to naming services, eXtensible Markup Language (XML) processing support, web services, security services, remote access support, messaging services, scripting language support, and the like.

Test process 150 is configured to test various aspects of software system under test 185. Here, spreadsheet DTO module 160 within test process 150 provides a user with spreadsheet templates that the user can use to create test cases for use in testing the objects 187 and/or services 189 in software system under test 185. In particular, spreadsheet template generator 162 is configured to automatically generate a spreadsheet template that stores information in a format that corresponds to a data transfer object (DTO) (which can alternatively be referred to as a data transport object) to be input to a particular module (e.g., object or service) being tested.

Spreadsheet DTO module 160 also generates DTOs from the information the user enters into the spreadsheet template. In particular, DTO generator 164 is configured to generate one or more DTOs from the information stored in a spreadsheet, such as a spreadsheet created by entering information into a spreadsheet template created by spreadsheet template generator 162.

Spreadsheet DTO module 160 is configured to interact with various other components of test process 150, such as inspection module 152, test manager 154, and user interface 156. User interface 156 provides an interface (e.g., a command line interface (CLI), graphical user interface (GUI), or the like) via which a user can view and select various testing options. In many embodiments, user interface 156 is implemented using well known graphical user interface elements such as windows, buttons, pull down menus, slide-bars, text fields, file selection tools, tree representations, and the like. In some embodiments, a user can access user interface 156 via a web client or browser.

A user can select one or more options corresponding to the functionality provided by spreadsheet DTO module 160 in order to interact with spreadsheet DTO module 160. For example, a particular menu can allow a user to select a module to be tested (e.g., by specifying the class name of the class from which that module is instantiated, as well as information needed to locate the module, such as host name, IP address, or port number, if the module is located remotely from test process 150).

Such a menu can also provide the user with options that allow the user to specify the input to the module to be tested. One option in that menu can specify that the input information should be read from a spreadsheet, and another option can request that an appropriate spreadsheet template, usable to create a spreadsheet from which input information can be read, be created. In response to the user selecting to first create a spreadsheet template, the functionality of spreadsheet template generator 162 can be invoked. In response to the user selecting to read input information from an existing spreadsheet, the functionality of DTO generator 164 can be invoked. In some embodiments, the functionality of DTO generator 164 can also be invoked by test manager 154 when a test is being implemented, in order to generate DTOs for each test case to be executed within the test.

In order to generate spreadsheet templates for use in testing a particular module (e.g., an object or service), spreadsheet template generator 162 interacts with inspection module 152. Inspection module 152 is configured to inspect a module within software system under test 185 in order to obtain the structural requirements of that module. Such structural requirements can specify or otherwise indicate the properties that should be included in a DTO that is input to that module.

In one embodiment, inspection module 152 uses introspection to obtain the structural requirements of a module to be tested. In general, introspection is the capability of a program to explicitly reveal, see, understand, and/or modify its own structure. For instance, an introspective object-oriented language allows an object to be queried for its attributes and methods, as well as for the types and values of those attributes and methods. Introspection is typically enabled via a reflection property. For example, the reflection capabilities of the Java™ programming language make it possible to query a Java™ Virtual Machine (JVM) for the structure of an object within the JVM. In response to such a query, the JVM returns an object that is an instance of a meta class named Class, and this object fully describes the type of the object with structures for (1) inheritance information: references to another object of class Class that describe the base class; (2) attribute information: a set of objects of class Field that describes all attributes in the class and carries the type information and methods to get or set the value of an attribute; and (3) methods information: a set of objects of class Method that capture the information of all methods in the class and carry the type of a return value, parameter description, and can be used to invoke the method. In one embodiment, inspection module 152 is implemented as described in U.S. patent application Ser. No. 11/328,423, titled "System and Method for Live Software Object Interaction," filed on Jan. 9, 2006 and naming John J. Michelsen as an inventor, which is hereby incorporated by reference as if completely and fully set forth herein.

Thus, inspection module 152 can obtain the class of a target module (e.g., as specified by a user via user interface 156) and then construct an instance of that class (or cause an instance to be constructed) and use introspection of that class in order to obtain the class's structural requirements. Inspection module 152 can also access other information, such as an object signature, Web Service Definition Language (WSDL) file, Enterprise Service Bus (ESB) patterns, messaging system descriptions, and the like in order to identify the structural requirements of a particular module. It is noted that, depending on the type of module being inspected, inspection module 152 can access multiple objects (e.g., additional modules can be identified in response to the target module containing a reference to one of the other objects, and so on) in order to extract the module's structural requirements. Inspection module 152 can then provide information indicating those structural requirements to spreadsheet template generator 162.

Inspection module 152 can also inspect the target module for metadata such as comments, definitions, and other human-readable documentation that defines or otherwise describes the information to be input to the target module. Inspection module 152 can also inspect related modules (e.g., modules that are referenced by the target module) for such human-readable documentation. Such human-readable documentation can be identified, for example, by detecting the presence of one or more characters used to identify the start of a comment or definition field within the target module's code.

In response to receiving the structural requirements from inspection module 165, spreadsheet template generator 162 identifies the properties of a DTO that satisfies the structural requirements and then generates a spreadsheet template that includes fields for each of the properties. If a particular property is hierarchical (e.g., if the value of a particular property is an array of non-trivial properties), spreadsheet template generator 162 creates a new tab (e.g., a new worksheet within a spreadsheet workbook) for the hierarchical property.

Spreadsheet template generator 162 also inserts instructions, definitions, and/or comments into the spreadsheet template, based upon comments, definitions, or other non-code information provided by inspection module 152. These instructions, definitions, and/or comments enhance the usability of the spreadsheet template by providing a user with easy to understand instructions and/or explanations of the information to be entered into the spreadsheet.

Once a spreadsheet template has been generated, spreadsheet template generator 162 saves that spreadsheet template (e.g., as spreadsheet file 168). If the user specified a file name for the template, spreadsheet template generator 162 can save the file under that name; otherwise, spreadsheet template generator 182 can generate an appropriate name (e.g., identifying the module to be tested).

DTO generator 164 is configured to read a spreadsheet (e.g., as identified by a user via user interface 156) and to use the information contained in that spreadsheet to generate one or more DTOs for a module being tested (e.g., as identified by a user via user interface 156). DTO generator 164 can use metadata (e.g., such as the property name and type information stored in rows 8 and 9 of the example spreadsheets shown in FIGS. 2A-2D) generated by spreadsheet template generator 162 to map the fields in the spreadsheet to the properties of the DTOs being generated. Such metadata can be encoded within the spreadsheet (e.g., in the form of column names and/or row identifiers) or stored separately from the spreadsheet. Once generated, the DTOs can be stored (e.g., as part of a test process property) and/or transferred across a network to a system under test.

The various software entities of FIG. 1 are shown as separate software modules, objects, or programs. These various entities, and indeed any of the software described herein, can be variously combined into single software modules, implemented on separate computer systems (e.g., as opposed to being separated by network 180, as shown in FIG. 1), executed as separate threads on a single computer system, and the like.

It is noted that FIG. 1 illustrates a specific example. The specific arrangement of components can vary in other embodiments. For example, in other implementations, software for both test process 150 and software system under test 185 can execute on the same computing device (e.g., in separate virtual machines or even the same virtual machine).

In other embodiments, different components can be used to implement the testing functionality described above. While specific software components have been described as implementing specific functionality, this functionality can be implemented by different components than those depicted herein. For example, the functionality of software system under test 185 can be subdivided into multiple different applications, each of which may execute on a different computing device. Furthermore, the specific components depicted in FIG. 1 can be combined or subdivided into fewer or additional components. Additionally, other components can be used instead of and/or in addition to those shown in FIG. 1. Such other components can provide different or additional functionality instead of and/or in addition to the functionality described herein. Furthermore, some of the functionality described herein can be eliminated in some embodiments.

FIGS. 2A-2D show an example spreadsheet that can be generated by a spreadsheet template generator (e.g., spreadsheet template generator 162 of FIG. 1) and/or processed by a DTO generator (e.g., DTO generator 164 of FIG. 1). These spreadsheets are generated for a DTO object named com.itko.example.dto.Customer. The properties of this DTO can be determined by inspecting the structural requirements of the Customer class (e.g., using introspection), as described above.

The Customer DTO has the following properties:

| Property Name | Type |
|---|---|
| balance: | Double |
| id: | int |
| name: | String |
| poAddr: | Address |
| since: | Date |
| types: | int[ ] |
| locations: | Address[ ] |

The Address DTO has the following properties:

| Property Name | Type |
|---|---|
| city: | String |
| line1: | String |
| line2: | String |
| state: | String |
| zip: | String |

In response to receiving information indicating the above properties (e.g., in the form of structural requirements identified by an inspection module), a spreadsheet template generator can create the spreadsheet template shown in FIGS. 2A and 2C. In this example, the first six Customer DTO properties can appear on one tab (labeled "com.itko.examples.dto.Customer"), which is shown in FIG. 2A. However, the locations property, which is a hierarchical property that includes an array of Address objects (as indicated by the brackets following the Address object's name in the Customer DTO's properties), requires a second tab (labeled "xamples.dto.Customer.locations"), which is shown in FIG. 2C.

As noted above, the spreadsheet template generator can insert information into the spreadsheet template that describes the template and the information to be entered into the template. In FIG. 2A, at the top, the spreadsheet template generator lists the DTO (Customer) in row 3 and, in row 2, the specific ("Spec") DTO object (Customer) being displayed in the current spreadsheet tab. The spreadsheet template generator can also list the Java document location ("Docs") for the Customer class in row 4, if available, as well as any static constructor fields (in row 6) and/or methods (in row 5) for the Customer class.

As shown in FIG. 2A, the first tab of the spreadsheet template corresponding to the above DTO includes a row (row 8) of column headers. Each cell in this row contains the name of the property whose value is to be stored in the same column as that cell. Each cell in the next row (row 9) contains information identifying the type of value for the named property.

As shown, the first column header of row 8, in column B, is named "Primary Key." This primary key is not a property of the DTO; instead, it is a property that the spreadsheet DTO module uses to correlate information in different tabs when generating the DTO from the information stored in the spreadsheet. Here, each primary key identifies a unique data object. The cell in column B of row 9 indicates that the values entered for the primary key should be unique per each row. Accordingly, in this example, each row in the top-level tab shown in FIG. 2A represents a unique data object that can be identified using a unique primary key.

The next column header, in column C of row 8, "balance," is the name of a property that has a value representing a customer balance. As shown by the cell in column C of row 9, the value of the balance property is of type "double." Similarly, the next column header, "id," (shown in column D of row 8) is the name of a property that has a value representing a customer identity ("id") and a type of integer ("int") (shown in column D of row 9). Likewise, the next column header in column E of row 8 identifies the property named "name" that has a value of type string (shown in column E of row 9).

The post office address ("poAddress") property shown in the table above has been "flattened" into multiple sub-properties (e.g., by the spreadsheet template generator). These properties include post office city ("poAddr.city") property of type string, post office address line1 ("poAddr.line1") of type string, post office address line2 ("poAddr.line2") of type string, post office address state ("poAddr.state") of type string, and post office address zip code ("poAddr.zip") of type string. These properties and their types are shown in respective columns F-J of rows 8 and 9.

The "since" property (identified in column K of row 8) is of type date (shown in column K of row 9), while the "types" property (identified in column L of row 8) is of type int[ ] (shown in column L of row 9), which specifies an array (as indicated by the brackets) of integers ("int")). The value of the types property can be entered as a comma separated list, as shown in FIG. 2B, and thus can be represented in a single tab.

Since the "locations" property of the Customer DTO is a hierarchical property, this property is not represented in the top-level tab corresponding to the Customer DTO. Instead, this property is represented in the second-level tab shown in FIG. 2C.

FIG. 2B illustrates how a user can enter information into the tab shown in FIG. 2A to create multiple test cases, where each test case represents a particular version of the Customer DTO. Each test case can be converted into a DTO by a DTO generator. In this example, three test cases have been entered by a user. The first test case has primary key 1, the second test case has primary key 2, and the third test case has primary key 3.

The first test case is stored in row 10. The first test case includes a balance of 50, an id of 101, a name of iTKO, a city of Dallas, an address line 1 of 1505 LBJ Freeway, an address line 2 of Suite 250, a state of TX, a zip of 75324, a since date of Aug. 11, 2007, and types of 1, 5, and 10.

The second test case is stored in row 11. The second test case includes a balance of 275, an id of 102, a name of Ron, a city of Plano, an address line 1 of 4509 Postbridge, no value for address line 2, a state of TX, a zip of 75024, a since date of Aug. 9, 2007, and types of 2, 4, and 9.

The third test case is stored in row 12. The second test case includes a balance of 1000, an id of 103, a name of John, a city of Dallas, an address line 1 of 1505 LBJ Freeway, an address line 2 of Suite 250, a state of TX, a zip of 75324, a since date of Aug. 7, 2007, and types of 3, 7, and 9.

FIG. 2C illustrates the second tab that can be created by a spreadsheet template generator for the DTO having the properties shown in the tables above. As shown in FIG. 2C, this second tab is labeled "xamples.dto.Customer.locations", which differentiates the second tab, which stores location data objects, from the top-level tab that is titled simply "com.itko.examples.dto.Customer" and that stores Customer data objects.

The second tab includes the same identifying information (e.g., Spec, DTO, Docs, Static Constructor Methods, and Static Constructor Fields, and the like) at the top of the worksheet (e.g., rows 2-6 of the example shown here) as the top-level tab of FIG. 2A. Similarly, the second tab includes a row of column headers (in row 8) that identifies the properties to be specified in this tab (a tab within a spreadsheet file can also be referred to as a worksheet within a workbook). These properties include the location data object properties named city, line1, line2, state, and zipcode, each of which is of type string (as indicated in columns D-H of rows 8 and 9).

A primary key column (column B) is included to uniquely identify each location data object in the second tab of FIG. 2C. However, instead of including only a single primary key column, like the high-level tab, the second tab also includes a second column that identifies the Customer data object that includes each location data object. This second column (in column C) is named com.itko.examples.dto.Customer, and thus references the top-level tab. Each value within this second column thus identifies a unique data object specified in the top-level tab.

FIG. 2D illustrates the values that a user can enter into the second tab of the spreadsheet template. As shown, seven location data objects have been specified. Each location data object has a unique primary key value.

The first three location data objects are contained in the first Customer data object of the top-level tab. This relationship is indicated by the value of the cell in column C of each row. The first location data object, in row 10, has a value of 1 in column C. This indicates that the location data object in row 10 is included in the Customer data object having primary key 1 in the top-level tab. Similarly, the location data objects defined in rows 11 and 12 are part of the Customer data object having primary key 1 in the top-level tab. Thus, as shown in FIG. 2B, the Customer data object having primary key 1, which is named iTKO, includes the three location data objects having primary keys 1-3 in FIG. 2D.

Similarly, the next two location data objects (specified in rows 13 and 14) are part of the second Customer data object (the Customer data object named "Ron" having primary key 2 in FIG. 2B) in the top-level tab. Likewise, the next two location data objects (specified in rows 15 and 16) are part of the third Customer data object (the Customer data object named "John" having primary key 3 in FIG. 2B).

In general, given a list of properties for a DTO such as those shown above, a spreadsheet template generator can create a new spreadsheet for the DTO. Within that spreadsheet, the spreadsheet template generator can generate a first tab or worksheet that represents all of the non-hierarchical properties of the DTO. Within that first tab, the spreadsheet template generator can insert descriptive information and general instructions obtained by inspecting a module to be tested and/or related modules.

The spreadsheet template generator can then generate column headers that identify each property represented in that first tab, as well as column headers identifying the appropriate data type of each identified property. An additional column header that identifies a primary key value can also be included. In one embodiment, primary key values are required to be unique per each row of this top-level tab, such that each row corresponds to a unique data object.

For each hierarchical property that cannot be represented in the first tab (e.g., for properties having values that are arrays of non-primitive, non-string values), the spreadsheet template generator can generate a new tab in the spreadsheet. This tab can include some of the same information (e.g., identifying the overall DTO to which the spreadsheet corresponds) as the top-level tab. Additionally, this tab includes appropriate column headers to describe the hierarchical property. For example, if the property to which the tab corresponds is an array of addresses, the tab can include appropriate column headers for each property included in the address property.

Furthermore, this lower-level tab includes a column that references a prior tab (e.g., the top-level tab). The lower-level tab can identify the tab being referenced (e.g., by indicating the name and/or number of that tab), and indicate that values in this column correlate a data object in a particular row of this tab with a data object in a row of another tab. The tab is formatted such that a user can enter information (e.g., a primary key used to identify a data object in a higher-level tab) correlating a data object within the lower-level tab with another data object in the higher-level tab. The data object in the higher-level tab includes the correlated data object in the lower-level tab.

It is noted that there can be multiple levels of hierarchy within a given property, and thus there can be more than two tabs in many embodiments. Some tabs may not refer to the top-level tab; instead, such tabs can refer to an intervening tab. In general, each tab is formatted such that information on that tab correlates each data object specified within that tab to a data object specified in a higher-level tab.

Figure 3:
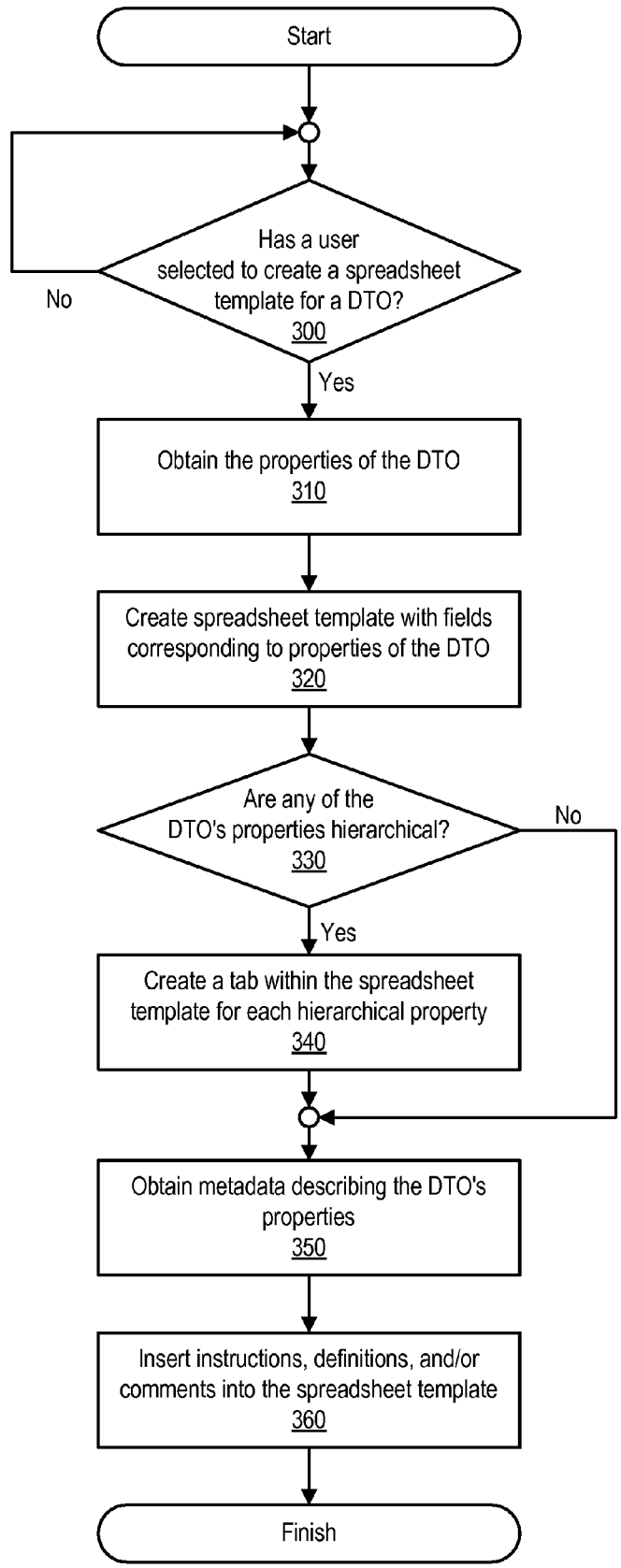
FIG. 3 is a flow chart of a method of generating a spreadsheet template for use in generating data transfer objects to test a particular object or service, according to one embodiment of the present invention.

FIG. 3 is a flowchart of a method of generating a spreadsheet template. This method can be performed by a spreadsheet template generator such as the one shown in FIG. 1.

The method begins at 300, when a user selects to create a spreadsheet template for a particular DTO. The user can select the DTO by selecting to test a particular module (e.g., an object or service) that consumes the DTO. The user can select the module by selecting, for example, a class name of the class from which the module is instantiated.

At 310, the spreadsheet template generator obtains the properties of the selected DTO. The spreadsheet template generator can obtain these properties from the structural requirements of the module that consumes the DTO (e.g., as obtained by an inspection module as described above). Such structural requirements can be obtained by instantiating the module and/or by otherwise inspecting the module and/or related modules (e.g., by parsing code and/or text implementing and/or describing such a module). Alternatively, the properties of the DTO may already be available (e.g., in a prespecified configuration file) for use by the spreadsheet template generator, without needing to access the module itself.

At 320, the spreadsheet template generator creates a spreadsheet template with fields corresponding to the properties of the DTO. If any of the DTO's properties are hierarchical properties that cannot be represented in a single tab of the spreadsheet, the spreadsheet template generator creates a tab within the spreadsheet for each such property, as shown at 330 and 340. Such a tab includes a field that can be used to link data objects specified in that tab with data objects specified in another tab.

The spreadsheet template generator can also obtain metadata or other human-readable documentation describing the DTO's properties (e.g., such information can be obtained by an inspection module inspecting the module that consumes the DTO and/or related modules referenced by the module), as shown at 350. This information can be inserted into the spreadsheet template in the form of instructions, definitions, and/or comments, as shown at 360. Such information can include information specifying the data type of each property value, as well as the identity of each property value.

Figure 4:
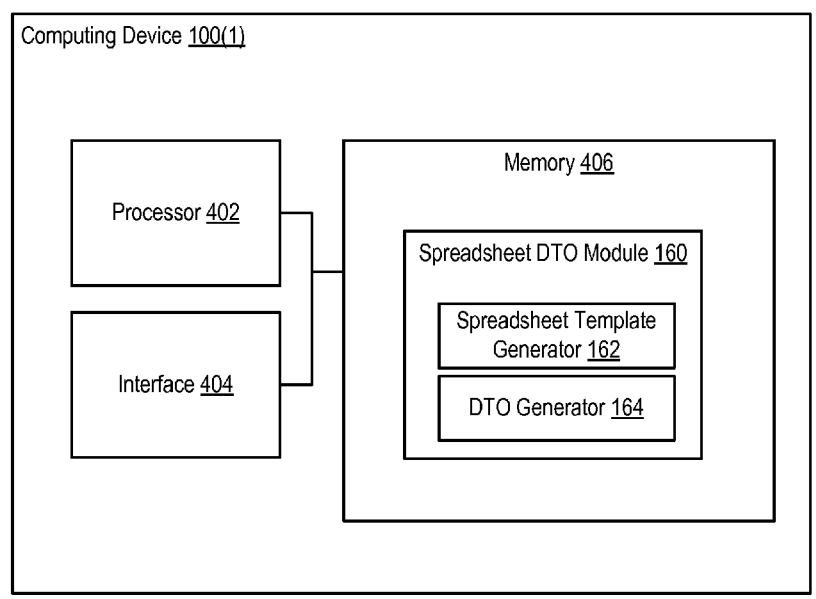
FIG. 4 is a block diagram of a computer system, which illustrates how a spreadsheet data transfer object module can be implemented in software, according to one embodiment of the present invention.

FIG. 4 is a block diagram of computing device 100(1) (e.g., computing device 100(1) of FIG. 1). Computing device 100(1) can be a personal computer, server, personal digital assistant, cell phone, laptop, workstation, or the like. Computing device 100(1) includes one or more processors 402 (e.g., microprocessors, PLDs (Programmable Logic Devices), or ASICs (Application Specific Integrated Circuits)) configured to execute program instructions stored in memory 406. Memory 406 can include various types of RAM (Random Access Memory), ROM (Read Only Memory), Flash memory, MEMS (Micro Electro-Mechanical Systems) memory, and the like. Computing device 500(1) also includes one or more interfaces 404. Processor 402, memory 406, and interface(s) 404 are coupled to send and receive data and control signals by a bus or other interconnect.

Interface(s) 404 can include an interface to a storage device (e.g., such as the one shown in FIG. 1) on which instructions and/or data, such as spreadsheets, are stored. Interfaces 404 can also each include an interface to a network, such as network 180 of FIG. 1, for use in communicating other devices. Interfaces 404 can also include interfaces to various peripheral Input/Output (I/O) devices, such as a monitor, on which a graphical interface (e.g., allowing a user to interact with spreadsheet DTO module 160) can be displayed.

In this example, program instructions and data implementing spreadsheet DTO module 160, which includes spreadsheet template generator 162 and DTO generator 164, are stored in memory 406 of computing device 100(1) and executed by processor 402. The program instructions and data implementing spreadsheet DTO module 160 can be stored on various computer readable media such as memory 406. In some embodiments, program instructions and data implementing spreadsheet DTO module 160 can be stored on a computer readable storage medium such as a CD (Compact Disc), DVD (Digital Versatile Disc), hard disk, optical disk, tape device, floppy disk, and the like. In order to be executed by processor 402, the instructions and data implementing spreadsheet DTO module 160 are loaded into memory from the other computer readable storage medium. The instructions and/or data implementing spreadsheet DTO module 160 can also be transferred to a computing device for storage in memory via a network such as the Internet or upon a carrier medium.

Although the present invention has been described in connection with several embodiments, the invention is not intended to be limited to the specific forms set forth herein. On the contrary, the present invention is intended to cover such alternatives, modifications, and equivalents as can be reasonably included within the scope of the invention as defined by the appended claims.

What is claimed is:

1. A method comprising:
    identifying properties of a data transfer object to be input to and operated upon by a particular module of a software system during tests of the software system, wherein the identifying includes:
        inspecting, using a processor device, structure of the particular module to identify one or more structural requirements of the particular module relating to operations of the particular module on data objects input to the particular module, and
        determining that the one or more properties satisfy the identified one or more structural requirements of the at least one particular module of the software system;
    automatically generating a spreadsheet template corresponding to the data transfer object, wherein the spreadsheet template comprises a respective grouping of cells for each of the determined one or more properties of the data transfer object, and wherein the spreadsheet template is configured to store information representing one or more versions of the data transfer object; and providing the information of the spreadsheet template for use in generating a particular one of the versions of the data transfer object for use as an input to the particular module during a particular test of the software system.

2. The method of claim 1, wherein the identified one or more properties of the data transfer object comprise a hierarchical property with a value comprising an array of nested properties, generating the spreadsheet template comprises generating a plurality of spreadsheet tabs, wherein a first one of the generated spreadsheet tabs is an upper-level tab corresponding to at least the hierarchical property and second one of the generated spreadsheet tabs is a lower-level tab corresponding to one or more of the nested properties, and a field of the lower-level tab identifies a grouping of cells of the upper-level tab.

3. The method of claim 1, wherein the grouping of cells comprises a spreadsheet column, the method further comprising generating metadata correlating columns of the spreadsheet template to properties of the data transfer object, wherein the metadata comprises a property identifier and a property type.

4. The method of claim 3, wherein the particular version of the data transfer object is generated based upon user-provided values entered into the spreadsheet template and the metadata.

5. The method of claim 1, further comprising extracting at least one comment from the one or more software modules of the software system, wherein the automatically generating the spreadsheet template comprises inserting the at least one comment into an instructions section of the spreadsheet template.

6. The method of claim 1, further comprising generating the one or more versions of the data transfer object, wherein each version of the data transfer object is generated based upon a respective set of user-provided values entered into the spreadsheet template.

7. The method of claim 6, further comprising providing the versions of the data transfer object as inputs to the software system during testing of the software system.

8. The method of claim 7, wherein the providing comprises transferring the versions of the data transfer object via a network.

9. The method of claim 1, further comprising:

identifying that a first property of the data transfer object comprises a second data transfer object, wherein the second data transfer object comprises a plurality of properties; and allocating a plurality of columns within a first tab of the spreadsheet template to the first property, wherein each of the columns corresponds to a respective one of the properties of the second data transfer object.

10. The method of claim 1, wherein the inspecting one or more structural requirements of the one or more software modules of the software system includes accessing at least one of: an object signature, a web services definition language (WSDL) file, and a messaging system description.

11. A non-transitory, computer readable storage medium comprising program instructions executable by at least one processing device to:

identify properties of a data transfer object to be input to and operated upon by a particular module of a software system during tests of the software system, wherein the identifying includes:

inspecting, using a processor device, structure of the particular module to identify one or more structural requirements of the particular module relating to operations of the particular module on data objects input to the particular module, and determining one or more properties satisfying the identified one or more structural requirements of the particular module of the software system;

automatically generate a spreadsheet template corresponding to the data transfer object, wherein the spreadsheet template comprises a respective grouping of cells for each of the determined one or more properties of the data transfer object, and wherein the spreadsheet template is configured to store information representing one or more versions of the data transfer object; and provide the information of the spreadsheet template for use in generating a particular one of the versions of the data transfer object for use as an input to the particular module during a particular test of the software system.

12. The non-transitory computer readable storage medium of claim 11, wherein the identified one or more properties of the data transfer object comprise a hierarchical property with a value comprising an array of nested properties, generating the spreadsheet template comprises generating a plurality of spreadsheet tabs, wherein a first one of the generated spreadsheet tabs is an upper-level tab corresponding to at least the hierarchical property and second one of the generated spreadsheet tabs is a lower-level tab corresponding to one or more of the nested properties, and a field of the lower-level tab identifies a grouping of cells of the upper-level tab.

13. The non-transitory computer readable storage medium of claim 11, wherein the program instructions are further executable to generate metadata correlating fields of the spreadsheet template to attributes of the data transfer object, wherein the metadata comprises a property identifier and a property type.

14. The non-transitory computer readable storage medium of claim 13, wherein the program instructions are executable to generate the data transfer object, based upon user-provided values entered into the spreadsheet template and the metadata.

15. The non-transitory computer readable storage medium of claim 11, wherein the program instructions are executable to extract at least one comment from the one or more software modules of the software system, wherein automatically generating the spreadsheet template comprises inserting the at least one comment into an instructions section of the spreadsheet template.

16. The non-transitory computer readable storage medium of claim 11, wherein the program instructions are executable to generate a plurality of versions of the data transfer object, wherein each of the versions of the data transfer object is generated based upon a respective set of user-provided values entered into the spreadsheet template.

17. The non-transitory computer readable storage medium of claim 11, wherein inspecting one or more structural requirements of the one or more software modules of the software system comprises accessing at least one of: an object signature, a web services definition language (WSDL) file, and a messaging system description.

18. The non-transitory computer readable storage medium of claim 11, wherein the program instructions are executable to:
  identify that a first property of the data transfer object comprises a second data transfer object, wherein the second data transfer object comprises a plurality of properties; and
  allocate a plurality of columns within a first tab of the spreadsheet template to the first property, wherein each of the columns corresponds to a respective one of the properties of the second data transfer object.

19. A system comprising:
  at least one processor device;
  at least one memory element;
  a spreadsheet template generator, adapted when executed by the at least one processor device to:
    identify one or more properties of a data transfer object to be input to and operated upon by a particular module of a software system during tests of the software system, wherein the one or more properties of the data transfer object are determined by:
      inspecting structure of the particular module to identify one or more structural requirements of the particular module relating to operations of the particular module on data objects input to the particular module, and
      determining that the one or more properties satisfy the identified one or more structural requirements of the particular module of the software system;
    automatically generate a spreadsheet template corresponding to the data transfer object, wherein the spreadsheet template comprises a respective grouping of cells for each of the one or more properties of the data transfer object, and wherein the spreadsheet template is configured to store information representing one or more versions of the data transfer object; and
  a data transfer object generator, adapted when executed by the at least one processor device to use the information stored in the spreadsheet template to generate a particular one of the versions of the data transfer object for use as an input to the particular module during a particular test of the software system.

20. The system of claim 19, wherein the identified one or more properties of the data transfer object comprise a hierarchical property with a value comprising an array of nested properties,
  generating the spreadsheet template comprises generating a plurality of spreadsheet tabs, wherein a first one of the generated spreadsheet tabs is an upper-level tab corresponding to at least the hierarchical property and second one of the generated spreadsheet tabs is a lower-level tab corresponding to one or more of the nested properties, and
  a field of the lower-level tab identifies a grouping of cells of the upper-level tab.

* * * * *